(12) United States Patent
Campbell

(10) Patent No.: US 12,728,707 B2
(45) Date of Patent: Sep. 8, 2026

(54) WINDOW VISOR EXTENSION

(71) Applicant: William Campbell, Beech island, SC (US)

(72) Inventor: William Campbell, Beech island, SC (US)

( * ) Notice: Subject to any disclaimer, the term of this patent is extended or adjusted under 35 U.S.C. 154(b) by 330 days.

(21) Appl. No.: 18/402,615

(22) Filed: Jan. 2, 2024

(65) Prior Publication Data

US 2025/0214399 A1 Jul. 3, 2025

(51) Int. Cl.
*B60J 3/02* (2006.01)

(52) U.S. Cl.
CPC .................................. *B60J 3/0208* (2013.01)

(58) Field of Classification Search
CPC ...... B60J 3/0208; B60J 3/0234; B60J 3/0256; B60J 3/065; B60J 3/0269; B60J 3/0273
USPC ...................... 296/97.5, 97.6, 97.8; D12/191
See application file for complete search history.

(56) References Cited

U.S. PATENT DOCUMENTS 2,831,726 A * 4/1958 Ralston .................. B60J 3/0208 296/97.6
2,842,395 A * 7/1958 Davis ..................... B60J 3/0208 296/97.6
2,921,813 A * 1/1960 Lowry ................... B60J 3/0208 296/97.6
5,306,065 A * 4/1994 Ades ...................... B60J 3/0208 296/97.8
9,493,055 B1 * 11/2016 Murat .................... B60J 3/0208
D1,093,252 S * 9/2025 Campbell .................... D12/191
2015/0197138 A1 * 7/2015 Kuenzel ................. B60J 3/0208 296/97.6

* cited by examiner

*Primary Examiner* — Roger L Pang
(74) *Attorney, Agent, or Firm* — The Iwashko Law Firm, PLLC; Lev Ivan Gabriel Iwashko

(57) ABSTRACT

A window visor extension removably connected to at least a portion of a visor of a vehicle, the window visor extension including a main body movably connected to the visor to at least partially cover a side window of the vehicle while disposed against the side window, a movable extension hingedly disposed on at least a portion of the main body to move from retracted against the main body in a first position to at least partially extended away from the main body in a second position, and move from extended away from the main body in the second position to retracted against the main body in the first position, such that the movable extension increases a total coverage area of the side window to block sunlight coming through the side window while the movable extension is extended, and a plurality of connecting rods removably connected to at least a portion of the main body to connect the main body to the visor.

5 Claims, 3 Drawing Sheets

WINDOW VISOR EXTENSION

BACKGROUND

1. Field

The present general inventive concept relates generally to a visor, and particularly, to a window visor extension.

2. Description of the Related Art

Glare caused by the Sun while driving can be a dangerous problem while driving, as it impairs driver visibility dramatically. Most vehicles have a visor installed on an interior of a vehicle that pivots to at least partially obstruct a windshield. The visor can be helpful, but it is not always effective such as driving position and/or direction of travel.

The visor within the vehicle is also able to rotate from the windshield to the driver's window. Generally, a front seat passenger has a similar visor that operates similarly. However, for the driver attempting to manipulate the visor while driving is also dangerous because it diverts the driver's attention away from the road.

Therefore, there is a need for a window visor extension that connects to the visor to allow a side window to be blocked with minimal effort.

SUMMARY

The present general inventive concept provides a window visor extension.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a window visor extension removably connected to at least a portion of a visor of a vehicle, the window visor extension including a main body movably connected to the visor to at least partially cover a side window of the vehicle while disposed against the side window, a movable extension hingedly disposed on at least a portion of the main body to move from retracted against the main body in a first position to at least partially extended away from the main body in a second position, and move from extended away from the main body in the second position to retracted against the main body in the first position, such that the movable extension increases a total coverage area of the side window to block sunlight coming through the side window while the movable extension is extended, and a plurality of connecting rods removably connected to at least a portion of the main body to connect the main body to the visor.

The movable extension may have a size less than a size of the main body.

The plurality of connecting rods may include a first rod movably connected to the main body, and a second rod removably connected to at least a portion of the visor to facilitate movement of the main body with respect to the visor.

The first rod may move in a first lateral direction or a second lateral direction in response to an application of force thereto.

The window visor extension may further include a plurality of brackets disposed on at least a portion of the main body to receive the first rod therethrough.

The window visor extension may further include a plurality of clips removably connected to at least a portion of the visor, each of the plurality of clips to receive the second rod thereon.

Each of the plurality of clips may have a knurled surface therein to increase a friction level to prevent the second rod from moving away from each of the plurality of clips.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Window Visor Extension 100
Main Body 110
Movable Extension 120
Connecting Rods 130
First Rod 131
Second Rod 132
Brackets 140
Clips 150

Figure 1A:
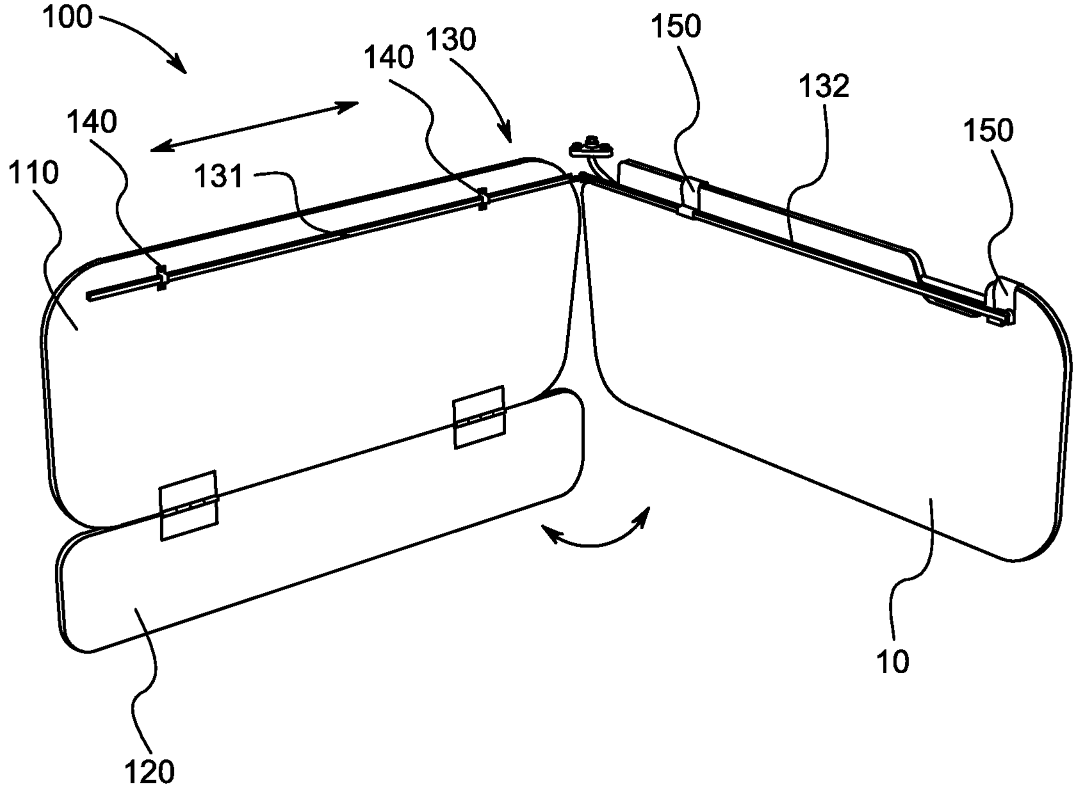
FIG. 1A illustrates a front perspective view of a window visor extension with a movable extension in an extended position, according to an exemplary embodiment of the present general inventive concept.

FIG. 1A illustrates a front perspective view of a window visor extension 100 with a movable extension 120 in an extended position, according to an exemplary embodiment of the present general inventive concept.

Figure 1B:
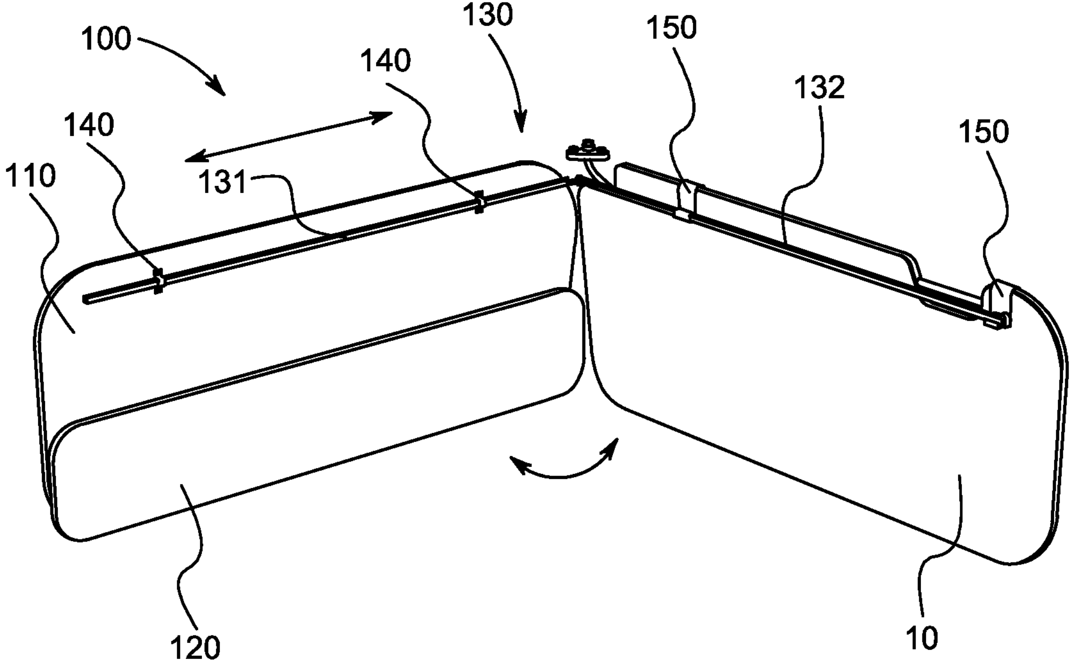
FIG. 1B illustrates a front perspective view of the window visor extension with the movable extension in a retracted position, according to an exemplary embodiment of the present general inventive concept.

FIG. 1B illustrates a front perspective view of the window visor extension 100 with the movable extension 120 in a retracted position, according to an exemplary embodiment of the present general inventive concept.

The window visor extension 100 may be constructed from at least one of metal, plastic, wood, glass, and rubber, etc., but is not limited thereto.

The window visor extension 100 may include a main body 110, a movable extension 120, a plurality of connecting rods 130, a plurality of brackets 140, and a plurality of clips 150, but is not limited thereto.

Referring to FIGS. 1A and 1B, the main body 110 is illustrated to have a rounded rectangular shape. However, the main body 110 may be rectangular, circular, triangular, pentagonal, hexagonal, heptagonal, octagonal, or any other shape known to one of ordinary skill in the art, but is not limited thereto.

The main body 110 may be removably connected to at least a portion of a visor 10. The main body 110 may have a size (i.e., a length, a width) corresponding to a size (i.e., a length, a width) of a window. More specifically, the main body 110 may be constructed based on a predetermined size of the window. Thus, the main body 110 may at least partially cover the window to prevent sunlight from moving therethrough.

The movable extension 120 may be movably (i.e., hingedly, pivotally, rotatably) disposed on at least a portion of the main body 110. The movable extension 120 may move (i.e., pivot, rotate) from retracted against the main body 110 in a first position to at least partially extended away from the main body 110 in a second position. Conversely, the movable extension 120 may move from extended away from the main body 110 in the second position to retracted against the main body 110 in the first position. In other words, the movable extension 120 may fold and/or flip against the main body 110. Alternatively, the movable extension 120 may fold and/or flip away from the main body 110, such that the movable extension 120 may extend and/or increase a total coverage area of the window to block more sunlight coming through the window while the movable extension 120 is extended.

It is important to note that a size (i.e., a length, a width) of the movable extension 120 may be less than the size of the main body 110.

The plurality of connecting rods 130 may include a first rod 131 and a second rod 132, but is not limited thereto.

The first rod 131 may be removably connected to at least a portion of the main body 110. Additionally, the first rod 131 may move (i.e., slide) in a first lateral direction (i.e., left) or a second lateral direction (i.e., right) in response to an application of force (e.g., pushing, pulling) thereto. Thus, the first rod 131 may move laterally to cover different sides of the window.

The second rod 132 may be removably connected to at least a portion of the visor 10. Moreover, the second rod 132 may be movably (i.e., hingedly, pivotably, rotatably) disposed at an end of the first rod 131. Thus, the first rod 131 may move (i.e., pivot, rotate) with respect to the second rod 132 and/or vice versa. As such, the main body 110 and/or the movable extension 120 may move with respect to the visor 10 by pivoting movement.

Furthermore, the main body 110 and/or the movable extension 120 may be distanced away from the visor 10 due to a connection between the first rod 131 and/or the second rod 132.

The plurality of brackets 140 may be disposed on at least a portion of the main body 110. Each of the plurality of brackets 140 may receive the first rod 131 therethrough. Additionally, the first rod 131 may move (i.e., slide) within each of the plurality of brackets 140. As such, each of the plurality of brackets 140 may facilitate sliding movement of the first rod 131.

The plurality of clips 150 may be removably connected (i.e., without tools, fasteners, screws, nails, bolts, etc.) to at least a portion of the visor 10. Each of the plurality of clips 150 may receive the second rod 132 thereon. Additionally, each of the plurality of clips may be magnetized to attract the second rod 132 thereto and/or have a knurled surface therein to increase a friction level to prevent the second rod 132 from moving away from each of the plurality of clips 150.

Figure 2:
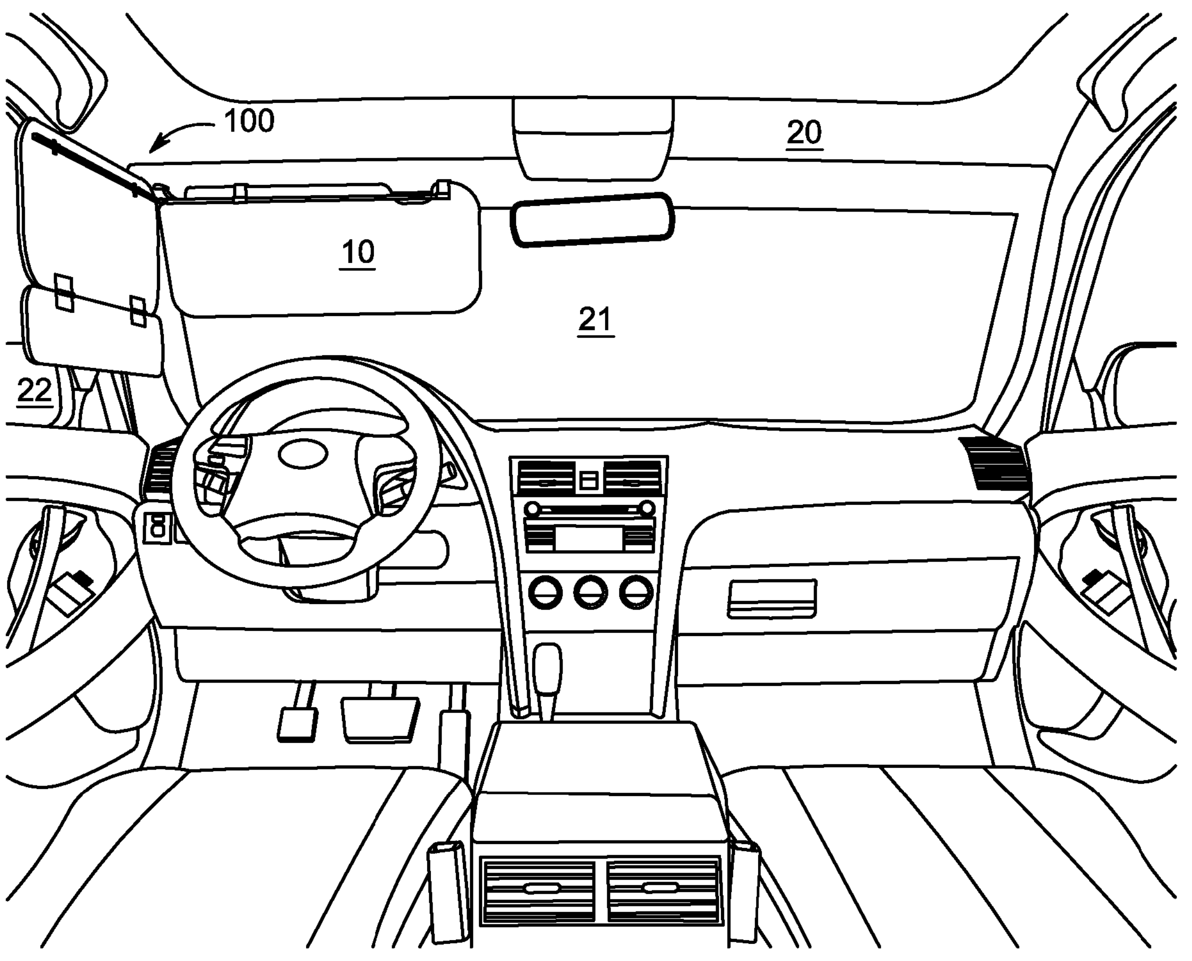
FIG. 2 illustrates a front perspective view of the window visor extension as disposed in a vehicle, according to an exemplary embodiment of the present general inventive concept.

FIG. 2 illustrates a front perspective view of the window visor extension 100 as disposed in a vehicle 20, according to an exemplary embodiment of the present general inventive concept.

Referring to FIG. 2, during use, the visor 10 may be disposed over a windshield 21 of a vehicle 20 while the main body 110 and/or the movable extension 120 may be disposed over a side window 22. However, the main body 110 and/or the movable extension 120 may also be used on a passenger side window and/or any other window in the vehicle 20.

Therefore, the window visor extension 100 may protect a driver and/or a passenger of the vehicle 20 from sun glare that could interfere with an ability of the driver to concentrate. Also, the window visor extension 100 may prevent harmful sunlight from damaging an interior of the vehicle 20.

The present general inventive concept may include a window visor extension 100 removably connected to at least a portion of a visor 10 of a vehicle 20, the window visor extension 100 including a main body 110 movably connected to the visor 10 to at least partially cover a side window 22 of the vehicle 20 while disposed against the side window 22, a movable extension 120 hingedly disposed on at least a portion of the main body 110 to move from retracted against the main body 110 in a first position to at least partially extended away from the main body 110 in a second position, and move from extended away from the main body 110 in the second position to retracted against the main body 110 in the first position, such that the movable extension 120 increases a total coverage area of the side window 22 to block sunlight coming through the side window 22 while the movable extension 120 is extended, and a plurality of connecting rods 130 removably connected to at least a portion of the main body 110 to connect the main body 110 to the visor 10.

The movable extension 120 may have a size less than a size of the main body 110.

The plurality of connecting rods 130 may include a first rod 131 movably connected to the main body 110, and a second rod 132 removably connected to at least a portion of the visor 10 to facilitate movement of the main body 110 with respect to the visor 10.

The first rod 131 may move in a first lateral direction or a second lateral direction in response to an application of force thereto.

The window visor extension 100 may further include a plurality of brackets 140 disposed on at least a portion of the main body 110 to receive the first rod 131 therethrough.

The window visor extension 100 may further include a plurality of clips 150 removably connected to at least a portion of the visor 10, each of the plurality of clips 150 to receive the second rod 132 thereon.

Each of the plurality of clips 150 may have a knurled surface therein to increase a friction level to prevent the second rod 132 from moving away from each of the plurality of clips 150.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A window visor extension removably connected to at least a portion of a visor of a vehicle, the window visor extension comprising:

a main body movably connected to the visor to at least partially cover a side window of the vehicle while disposed against the side window;

a movable extension hingedly disposed on at least a portion of the main body to move from retracted against the main body in a first position to at least partially extended away from the main body in a second position, and move from extended away from the main body in the second position to retracted against the main body in the first position, such that the movable extension increases a total coverage area of the side window to block sunlight coming through the side window while the movable extension is extended;

a plurality of connecting rods removably connected to at least a portion of the main body to connect the main body to the visor, the plurality of connecting rods comprising:

a first rod movably connected to the main body, and a second rod removably connected to at least a portion of the visor to facilitate movement of the main body with respect to the visor; and a plurality of clips removably connected to at least a portion of the visor, each of the plurality of clips to receive the second rod thereon.

2. The window visor extension of claim 1, wherein the movable extension has a size less than a size of the main body.

3. The window visor extension of claim 1, wherein the first rod moves in a first lateral direction or a second lateral direction in response to an application of force thereto.

4. The window visor extension of claim 1, further comprising:

a plurality of brackets disposed on at least a portion of the main body to receive the first rod therethrough.

5. The window visor extension of claim 1, wherein each of the plurality of clips have a knurled surface therein to increase a friction level to prevent the second rod from moving away from each of the plurality of clips.

* * * * *